United States Patent
Teichmann et al.

(10) Patent No.: US 8,919,845 B2
(45) Date of Patent: Dec. 30, 2014

(54) VEHICLE INTERIOR TRIM PART AS WELL AS METHOD FOR MANUFACTURING A VEHICLE INTERIOR TRIM PART

(75) Inventors: Jürgen Teichmann, Peine (DE); Heinrich Raussen, Peine (DE)

(73) Assignee: Faurecia Innenraum Systems GmbH, Hagenbach (DE)

(*) Notice: Subject to any disclaimer, the term of this patent is extended or adjusted under 35 U.S.C. 154(b) by 0 days.

(21) Appl. No.: 13/695,235

(22) PCT Filed: Apr. 28, 2011

(86) PCT No.: PCT/EP2011/002131
§ 371 (c)(1),
(2), (4) Date: Jan. 8, 2013

(87) PCT Pub. No.: WO2011/134658
PCT Pub. Date: Nov. 3, 2011

(65) Prior Publication Data
US 2013/0200646 A1    Aug. 8, 2013

(30) Foreign Application Priority Data
Apr. 29, 2010  (DE) .................. 10 2010 019 153

(51) Int. Cl.
*B60R 13/02* (2006.01)
*B29C 44/12* (2006.01)
*B29C 44/14* (2006.01)
*B29C 43/18* (2006.01)

(52) U.S. Cl.
CPC ......... *B60R 13/0256* (2013.01); *B29C 44/1266* (2013.01); *B29C 44/146* (2013.01); *B29C 43/18* (2013.01); *B60R 13/02* (2013.01); *B60R 13/0206* (2013.01)
USPC ............................................. 296/1.08; 296/70

(58) Field of Classification Search
USPC ................... 296/1.08, 70, 146.7; 428/76, 160
See application file for complete search history.

(56) References Cited

U.S. PATENT DOCUMENTS 4,347,276 A   8/1982   Weber et al.
6,475,576 B1  11/2002  Ashtiani
(Continued)

FOREIGN PATENT DOCUMENTS

DE   3016199   11/1981
DE   3844636   5/1990
(Continued)

OTHER PUBLICATIONS

International Search Report for PCT/EP2011/002131 dated Jul. 26, 2011, 3 pages (translated).
(Continued)

*Primary Examiner* — Glenn Dayoan
*Assistant Examiner* — Jason S Daniels
(74) *Attorney, Agent, or Firm* — Reising Ethington P.C.

(57) ABSTRACT

A vehicle interior trim part having a molded skin, an intermediate layer, a substrate, at least one reinforcing element arranged in the intermediate layer, and at least one fixing element formed as a part of the skin which acts to fix the position of reinforcing element so that its position cannot inadvertently change as the vehicle interior trim part is being produced. The fixing element is formed as at least one rib-shaped, elevated portion from the same material as the remaining molded skin. A method for producing the vehicle interior trim part is also provided.

11 Claims, 5 Drawing Sheets

(56) References Cited

U.S. PATENT DOCUMENTS

| | | |
|---|---|---|
| 6,558,604 B1 | 5/2003 | Beckmann |
| 2001/0030070 A1 | 10/2001 | Teranishi et al. |
| 2008/0012382 A1* | 1/2008 | Evans .............................. 296/70 |

FOREIGN PATENT DOCUMENTS

| | | |
|---|---|---|
| DE | 19704383 | 8/1998 |
| DE | 19962551 | 1/2001 |
| DE | 602004012790 | 4/2009 |
| EP | 0949124 | 10/1999 |
| JP | 2008064188 A * | 3/2008 |

OTHER PUBLICATIONS

Written Opinion for PCT/EP2011/002131 dated Jul. 26, 2011, 4 pages (in German only).

* cited by examiner

VEHICLE INTERIOR TRIM PART AS WELL AS METHOD FOR MANUFACTURING A VEHICLE INTERIOR TRIM PART

TECHNICAL FIELD

The invention relates to a vehicle interior trim part which can be formed, for example, as a dashboard having a molded skin, an intermediate layer, a carrier and at least one reinforcement element arranged in the intermediate layer as well as to a method of manufacturing such a vehicle interior trim part.

BACKGROUND

It is known in accordance with the prior art first to manufacture a molded skin by spraying onto a mold or by rotational sintering for manufacturing a vehicle interior trim part such as a dashboard. Subsequently, the molded skin and a carrier likewise previously manufactured are inserted into a foaming tool and back-foamed. To define bends of the molded skin, for example at openings to be introduced for air discharge installations, with an exact positioning, it is known also to arrange reinforcement elements in the foaming tool at the points of the intended bends of the molded skin.

However, the problem results in this respect that the reinforcement elements can float up on the back foaming. A position of the reinforcement elements and thus of the bends of the molded skin is hereby varied. In the worst case, the reinforcement elements can move into a region in which an opening should later be introduced. This can have the result that tools which are used for introducing the openings are damaged. If the opening is stamped out, for example, a reinforcement element which has slipped into the region of the opening can result in a blade break in the stamp used.

Vehicle interior trim parts having reinforcement elements arranged in the intermediate layer are known, for example, from documents DE 60 2004 012 790 T2, DE 199 62 551 A1 and DE 30 16 199 A1.

SUMMARY

It is therefore an object of the invention reliably to prevent an unwanted variation of the position of the reinforcement element during back foaming. This object is achieved by a vehicle interior trim part having the features of claim 1 and by a method having the features of claim 11. Advantageous further developments and embodiments result from the features of the dependent claims.

Since the means for fixing the reinforcement element are arranged at the molded skin or since the molded skin includes means for fixing the reinforcement element, a slipping of the reinforcement element is reliably prevented on the back foaming so that the positions of the bends of the molded skin are reliably defined.

In a preferred embodiment, the means for fixing are formed as at least one elevated portion and particularly preferably as at least one rib-shaped elevated portion. Such elevated portions can be simply applied to the molded skin or can be particularly preferably manufactured with the molded skin as a component thereof.

In a further advantageous embodiment, the means for fixing are arranged on a visible side of the molded skin. The means for fixing can hereby already be taken into account in a mold for manufacturing the molded skin such that a negative of the means for fixing is introduced into the mold surface as a recess. The means for fixing can equally be arranged on a rear side of the molded skin. Means for fixing arranged in this manner can also be manufactured easily, for example in that additional plastic is applied in those regions in which the means for fixing are desired on the manufacture of the molded skin. A single-part formation of the means for fixing with the molded skin is thus possible. The means for fixing can in this respect be formed from the same material as the remaining molded skin. The application of the additional plastic can take place, for example, in that additional plastic is sprayed on or such that the regions in which means for fixing are to be provided are heated more during rotational sintering.

In a particularly preferred embodiment, the means for fixing are made and arranged for the indirect fixing of the reinforcement element, particularly preferably such that a deformation of the molded skin is triggered by the means for fixing by which deformation the reinforcement element is fixed.

In a further particularly preferred embodiment, the means for fixing can be designed for the shape-matched holding of the reinforcement element. A particularly simple manufacture of a reinforcement element is possible when it is formed as a reinforcement wire.

In a further particularly preferred embodiment, the dashboard or the vehicle interior trim part has at least one opening. The opening can preferably receive an air discharge installation. The opening can naturally also be designed for receiving other components, for example a radio, satellite navigation, glove box, rotary light switch, operating element of a vertical headlight adjustment or the like. If the dashboard or the vehicle interior trim part has an opening, the reinforcement element can preferably be formed running around the opening. A bending of the molded skin about the opening can hereby be realized.

The reinforcement element can particularly preferably be formed as a (wire) ring running around the opening. It is in particular advantageous when the reinforcement element is formed as a reinforcement element running around the opening if the means for fixing are likewise arranged and formed running around the opening. The intermediate layer can particularly preferably be formed as a foamed intermediate layer. Such a layer can be manufactured very easily.

The invention furthermore relates to a method of manufacturing a dashboard or a vehicle interior trim part. In such a method, a mold is first provided which has a mold surface in which an additional recess is arranged which can serve the forming of the means for fixing. Subsequently, the molded skin is manufactured by spraying onto the mold or by rotational sintering using the mold such that plastic penetrates into the additional recess and later forms an elevated portion applied to the molded skin.

The molded skin manufactured in this manner is subsequently inserted into a foaming tool together with a carrier, likewise previously manufactured, and with the reinforcement element, with a local additional deformation of the molded skin being caused by the elevated portion applied to the molded skin by which deformation the reinforcement element is fixed. The molded skin is subsequently back-foamed such that the reinforcement element is embedded into a foam layer.

BRIEF DESCRIPTION OF THE DRAWINGS

Advantageous embodiments of the invention will be explained in the following with reference to the Figures. There are shown:

FIG. 1b a detail of the mold shown in FIG. 1a;

DETAILED DESCRIPTION OF THE ILLUSTRATED EMBODIMENTS

Figure 1A:
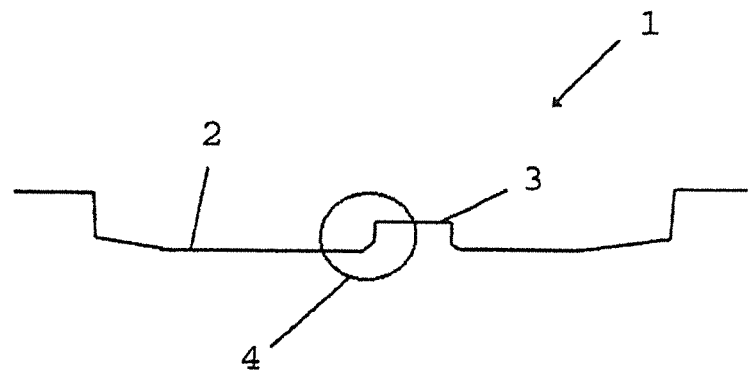
FIG. 1a a mold for manufacturing a molded skin.

A mold 1 for manufacturing a molded skin for a dashboard or for another vehicle interior trim part is shown in FIG. 1*a*. The mold 1 has an inner side 2 designed for forming a visible side of the molded skin. The mold furthermore has an elevated region 3 with which a bend of the molded skin is realized in the region of an opening to be introduced later.

Figure 1B:
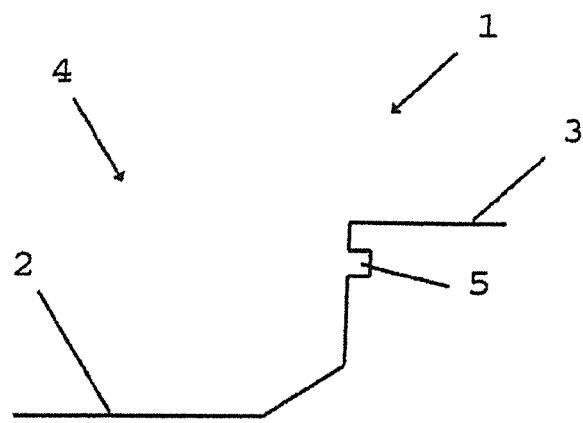

A detail 4 of the mold 1 is shown in more detail in FIG. 1*b*. As can be recognized from FIG. 1*b*, the mold 1 has an additional recess 5 which is arranged in a flank forming a transition to the elevated region 3.

Figure 1C:
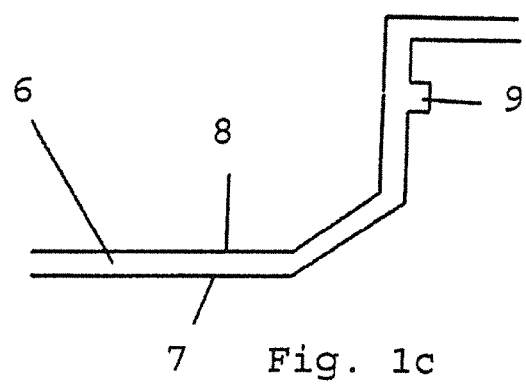
FIG. 1c a region of a molded skin manufactured using the mold from FIGS. 1a and 1b.

A detail of a molded skin 6 is shown in FIG. 1*c*, with the detail corresponding to a section of the molded skin 6 manufactured by the region of the mold shown in detail 4. The molded skin 6 has a visible side 7 and a rear side 8. The visible side 7 is in this respect the side of the molded skin 6 molded using the inner side 2 of the mold 1. The molded skin has an elevated portion 9 which is formed in rib shape in the present embodiment and is arranged on the visible side 7 of the molded skin 6.

Figure 1D:
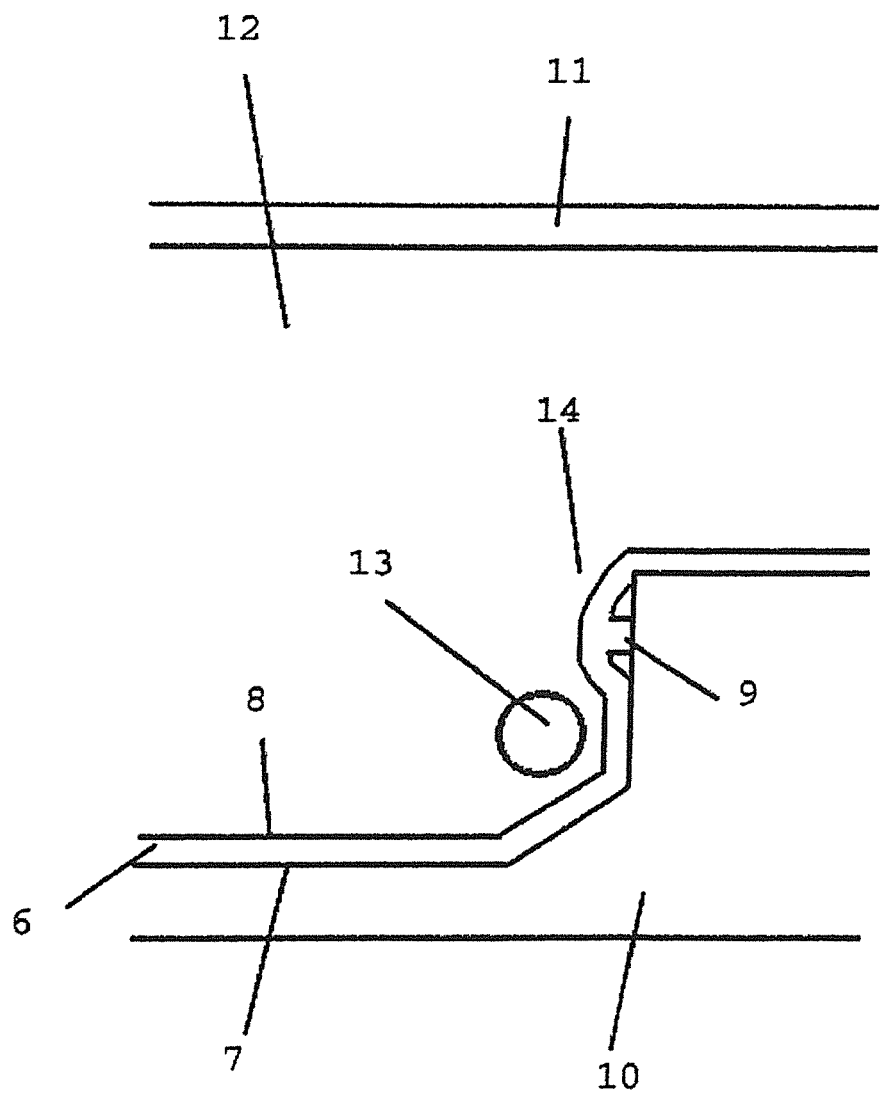
FIG. 1*d* an arrangement of the molded skin, of a carrier and of a reinforcement element in a molding tool.

The molded skin 6 is arranged on a lower side 10 of a foaming tool in FIG. 1*d*. A carrier 11 is located at the top in the molding tool, with an intermediate space being enclosed between the carrier 11 and the molded skin 6. A reinforcement element 13 which is formed as a wire ring in the present embodiment is arranged within the intermediate space 12. The elevated portion 9 arranged at the visible side 7 of the molded skin 6 is urged away from the lower side 10 of the foaming tool. The molded skin 6 hereby forms an elevated portion 14 directed into the intermediate space 12. The elevated portion 14 directed into the intermediate space 12 prevents the reinforcement element 13 from being able to flow upwardly on the back foaming since it establishes a form fit in this direction.

Figure 1E:
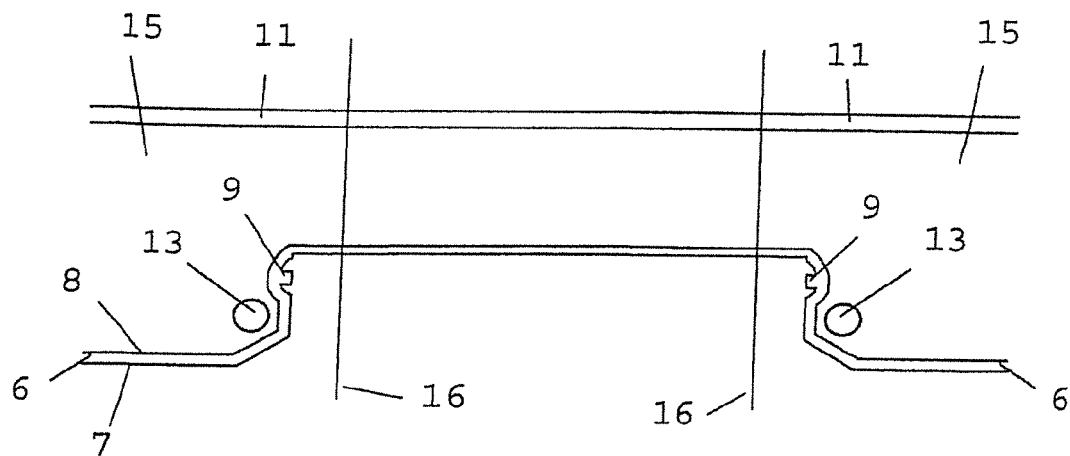
FIG. 1*e* a dashboard prior to the introduction of an opening.
Figure 1F:
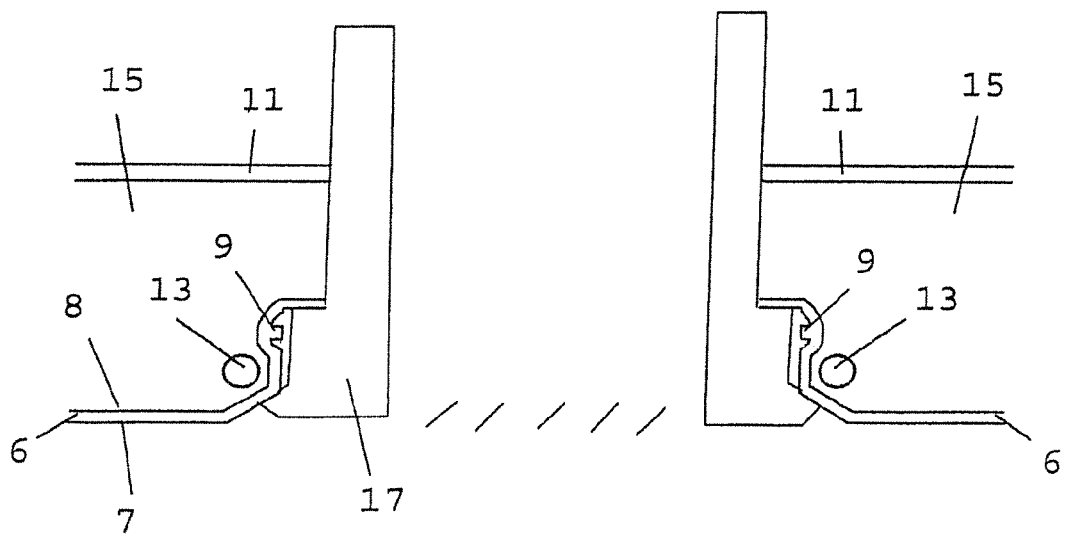
FIG. 1*f* a dashboard after the introduction of an opening and after an installation of an air discharge installation.

A region of a dashboard prior to the introduction of an opening is shown in FIG. 1*e*. The region shown includes the section of the molded skin 6 which was formed by the elevated region 3 of the mold 1. A foam layer 15 is arranged between the carrier 11 and the molded skin 6. Subsequently, the region of the dashboard between the two lines 16 is stamped out. As can be recognized from FIG. 1*f*, an air discharge installation 17 is inserted into the opening thereby formed. It must be pointed out that openings can be worked into other vehicle interior trim parts in the same manner and inserts such as air discharge installations 17 can be installed.

Figure 2:
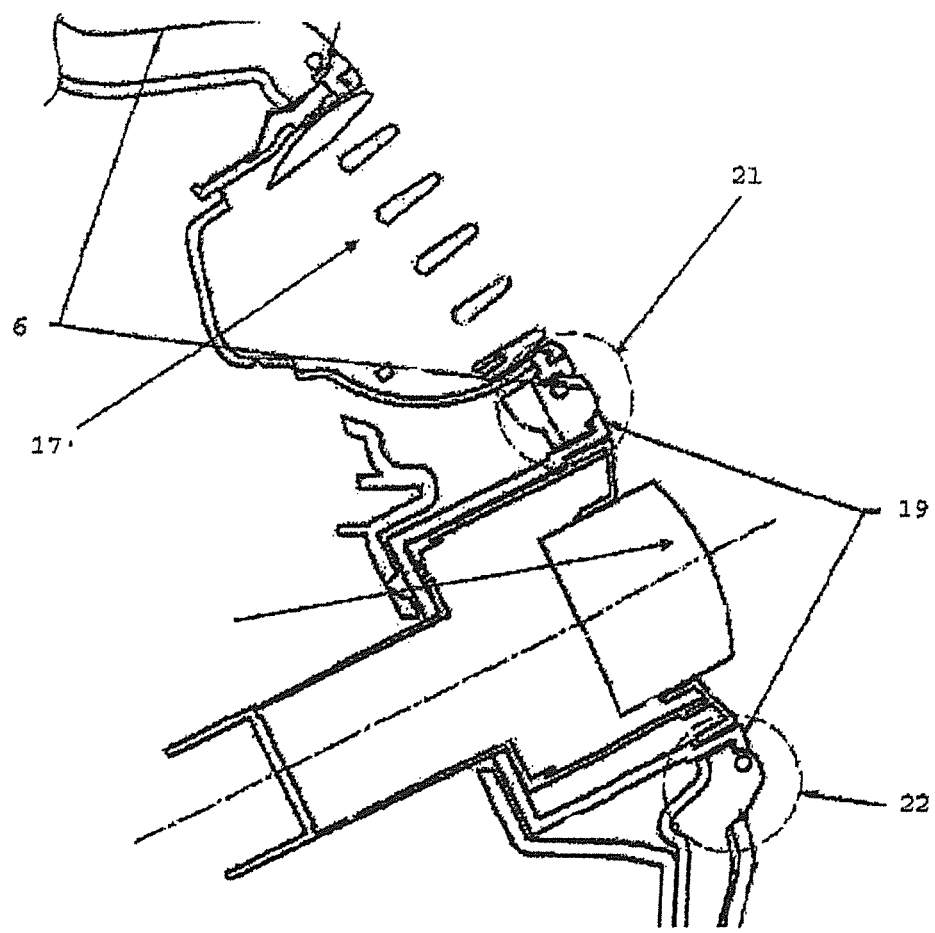
FIG. 2 a detail of a dashboard in accordance with a second embodiment of the invention.
Figure 2A:
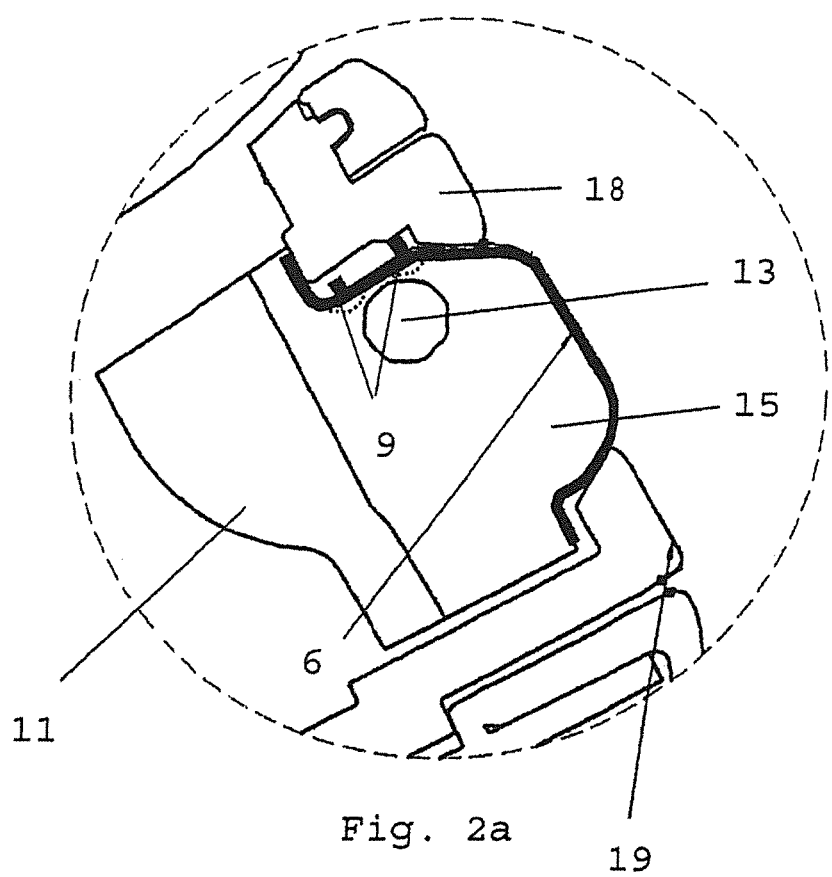
FIG. 2*a* a detail of the second embodiment of an advantageous dashboard.
Figure 2B:
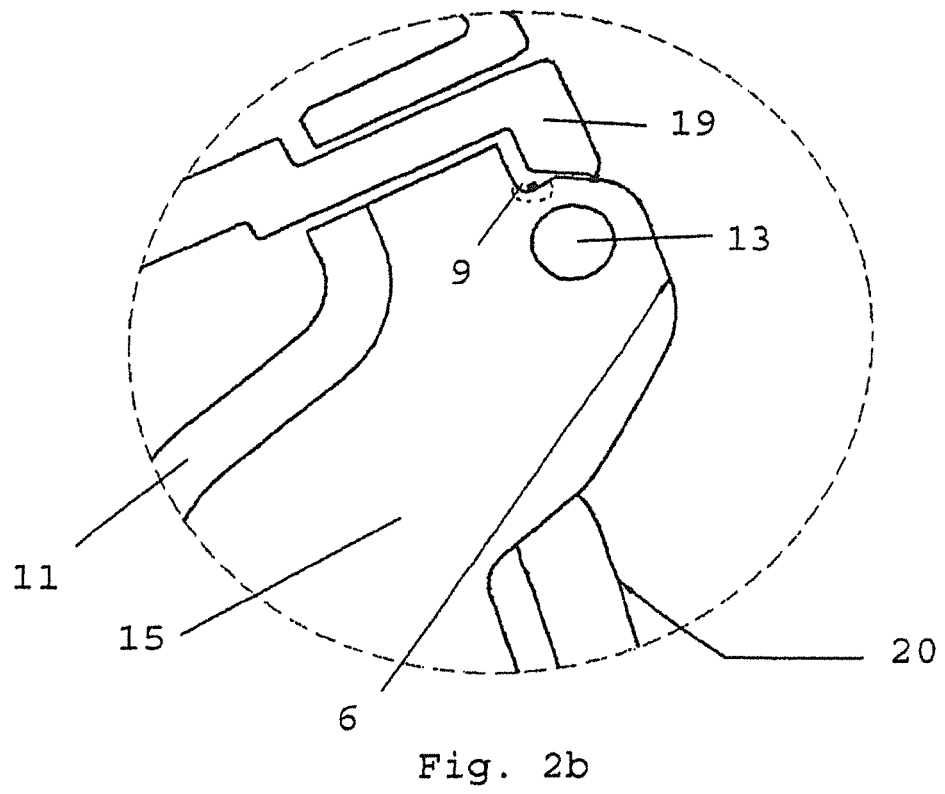
FIG. 2*b* a further detail of the second embodiment of an advantageous dashboard.

A detail of a further embodiment of a preferred vehicle interior trim part (for example of a dashboard) is shown in FIG. 2, with FIGS. 2*a* and 2*b* showing the details marked by the numerals 21 and 22. In the embodiment, too, the dashboard includes a molded skin 6, a carrier 11, a foamed intermediate layer 15 and a reinforcement element 13. The reinforcement element 13 is here also fixed by fixing elements formed as elevated portions 9.

A diaphragm 18 of an air discharge installation can be recognized adjacent to the molded skin 6. In addition, a diaphragm 19 of a rotary light switch is shown. A further diaphragm 20 can moreover be seen in the detail shown in FIG. 2*b*. Even though the means for fixing 9 are designed as elevated portions applied to the molded skin 6 in the embodiments shown, other designs are also possible in principle. Elevated portions could, for example, also be applied to the rear side 8 of the molded skin 6. It would equally be possible that the elevated portions 9 are not designed as a component of the molded skin, but are rather subsequently bonded thereto.

The invention claimed is:

1. A vehicle interior trim part having a molded skin, an intermediate layer, a carrier and at least one reinforcement element arranged in the intermediate layer, characterized in that means for fixing the reinforcement element are arranged at the molded skin or the molded skin includes means for fixing the reinforcement element, further characterized in that the means for fixing the reinforcement element are formed as at least one elevated portion from the same material as the remaining molded skin, wherein the at least one elevated portion locally increases the thickness of the molded skin; wherein the means for fixing are formed and designed for the indirect fixing of the reinforcement element by generating a deformation of the molded skin.

2. A vehicle interior trim part in accordance with claim 1, characterized in that the means for fixing are formed as at least one rib-shaped elevated portion.

3. A vehicle interior trim part in accordance with claim 1, characterized in that the means for fixing are arranged on a visible side of the molded skin or on a rear side of the molded skin.

4. A vehicle interior trim part in accordance with claim 1, characterized in that the means for fixing are formed in one part with the molded skin.

5. A vehicle interior trim part in accordance with claim 1, characterized in that the means for fixing are formed for the shape-matched holding of the reinforcement element.

6. A vehicle interior trim part in accordance claim 1, characterized by an opening in which an air discharge installation is arranged.

7. A vehicle interior trim part in accordance with claim 6, characterized in that the reinforcement element is formed as a reinforcement element running around the opening and as a ring running around the opening, with the means for fixing being formed as means for fixing running around the opening.

8. A vehicle interior trim part in accordance with claim 1, characterized in that the intermediate layer is formed as a foamed intermediate layer.

9. A vehicle interior trim part having a molded skin, an intermediate layer, a carrier and at least one reinforcement element arranged in the intermediate layer, characterized in that means for fixing the reinforcement element are-arranged at the molded skin or the molded skin includes means for fixing the reinforcement element, further characterized in that the means for fixing the reinforcement element are formed as at least one elevated portion from the same material as the remaining molded skin, wherein the at least one elevated portion locally increases the thickness of the molded skin; and further characterized in that the reinforcement element is formed as a reinforcement wire.

10. A method of manufacturing a vehicle interior trim part comprising the steps:

providing a mold which has a mold surface having an additional recess;

manufacturing a molded skin by spraying or rotational sintering using the mold such that plastic penetrating into the additional recess forms an elevated portion applied to the molded skin, the elevated portion being formed from the same material as the molded skin;

inserting the molded skin and a reinforcement element into a foaming mold, with a local additional deformation of the molded skin being caused by the elevated portion by which deformation the reinforcement element is fixed; and back foaming the molded skin such that the reinforcement element is embedded into a foam layer.

11. A vehicle interior trim part in accordance with claim 1, wherein the interior trim part comprises a vehicle dashboard.

* * * * *